Dec. 16, 1924.

F. RAPP 1,519,262

CRANK BASE FOR RAILWAY SIGNAL APPARATUS

Filed Nov. 14, 1923

INVENTOR
Fred Rapp
BY Ernest D. Jansson
ATTORNEY

Patented Dec. 16, 1924.

1,519,262

UNITED STATES PATENT OFFICE.

FRED RAPP, OF WEST ALBANY, NEW YORK.

CRANK BASE FOR RAILWAY SIGNAL APPARATUS.

Application filed November 14, 1923. Serial No. 674,679½.

*To all whom it may concern:*

Be it known that I, FRED RAPP, a citizen of the United States, residing at West Albany, in the county of Albany and State of New York, have invented certain new and useful Improvements in Crank Bases for Railway Signal Apparatus, of which the following is a specification.

My invention relates to railway signal apparatus, and the object of my invention is to improve the crank-bases used with such apparatus by making the length between the top and bottom bearing surfaces easily adjustable while in place on their anchorages so as to properly accommodate cranks having different thicknesses at the hinge point.

I accomplish my object by constructing a crank-base and bearing pin substantially as illustrated in the accompanying drawings, in which.

The same reference characters refer to the same parts throughout the several views.

Figure 1:
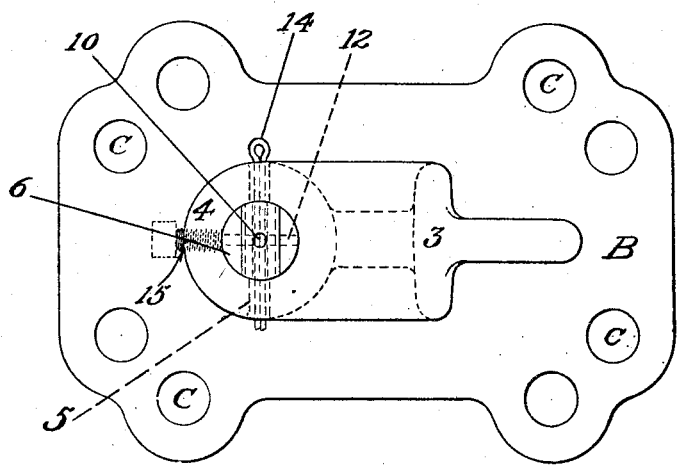
Fig. 1 is a top plan view of a crank-base and bearing pin made in accordance with my invention.
Figure 2:
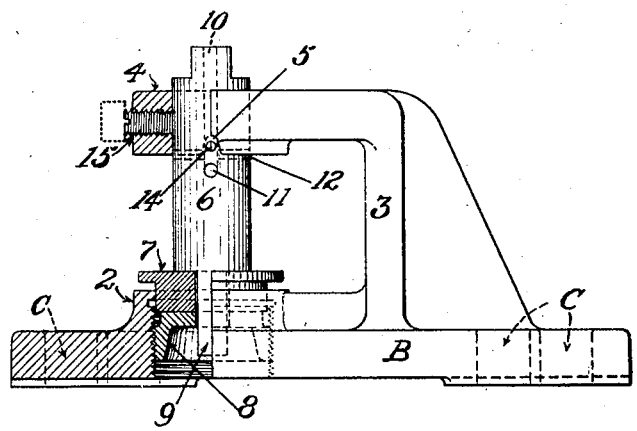
Fig. 2 is a side elevation of Fig. 1, part broken away.

Referring to the drawings, B represents the main casting of my improved crank-base, provided with a number of bolt-holes C, whereby it may be secured to the usual anchorage. On the upper surface of the casting is formed a bearing boss 2, and above and in line therewith is a second boss 4, supported by a bracket 3.

This main casting is of substantially the same form as the usual crank-base except that I form a groove 5 across the lower surface of the boss 4.

Instead of simply drilling the two bosses to receive the usual bearing pin, I drill the upper boss to fit the bearing pin 6, and the lower boss (and the base plate proper) I bore out to receive the flanged bushing 7, and thread a portion of the hole to receive the threaded bushing 8.

Central in the bushings 7 and 8 is a slotted hole adapted to pass the flattened projection 9 on the bottom end of the bearing pin 6, so that the turning of the pin 6 will cause the bushings 7 and 8 to turn and the bushing 8 to rise or lower in the boss 2, and so raise or lower the bushing 7. The hole in the bushing 8, and the lower end 9, of the bearing pin 6, may be of any shape other than round. If the two were round the turning of the pin 6, would fail to cause like movement of the bushing 8.

The upper end of the bearing pin 6, is preferably flattened so as to permit its easy manipulation with a wrench, and has an oil hole drilled therein at 10, and cross ported at 11, so as to introduce oil at opposite sides on the working surface of the pin. A number of holes 12, are also drilled through the pin 6 adapted to receive a pin or cotter 14, introduced through the groove 5, so as to lock the pin 6, (and the bushings 7 and 8) in adjusted position.

A suitable gib screw, or a set screw, 15 may be provided in the boss 4.

In my improved crank-base, the distance between the bottom of the boss 4, and the top of the flanged bushing 7, is to be equal to the greatest distance which is required by the cranks having the greatest thickness through the pivot point, and when a crank having a lesser thickness at that point is to be used the distance between the bottom of the boss 4, and the top of the flanged bushing 7 may be reduced by simply turning the bearing pin 6 so as to cause the bushing 8 to be forced upward in the threaded opening and carry with it the bushing 7.

I prefer to use two bushings 7 and 8, and to make the bushing 7 of brass, and the bushing 8 of iron galvanized, but it is of course obvious that the hole through the boss 2 could be threaded so as to use a single bushing flanged at the top end and threaded throughout the balance of its length.

With my improved crank-base it is possible to easily vary the distance between the upper and lower end bearing surfaces so as to accommodate cranks with different thicknesses at the pivot point, and to make the adjustment with the crank in place and the crank-base fastened on its anchorage.

I claim:

1. In a crank-base for railway signal apparatus: a base adapted to be attached to a foundation, a vertical threaded opening therein; in said threaded opening a threaded bushing, with a slotted hole substantially central therein; a bearing pin the bottom end thereof shaped to fit into said slotted opening, and an upper bearing for said pin said bearing spaced above and supported from said base.

2. In a crank-base for railway signal apparatus: a base adapted to be attached to a foundation, a vertical threaded opening in said base; in said opening a threaded bushing, with a slotted opening substantially central therein; a bearing pin the lower end thereof shaped to fit said slotted opening; an upper bearing for said pin spaced above and supported from said base; and means connected with said upper bearing for locking said pin in position.

3. In a crank-base for railway signal apparatus: a base adapted to be attached to a foundation, a vertical threaded opening in said base; in said opening a threaded bushing with an opening therein; an upper bearing spaced above and supported from said base; a bearing pin the upper end thereof fitting and supported in said upper bearing, the lower end of said pin adapted to enter the opening in and drive said threaded bushing; and means for locking said bearing pin.

In testimony whereof I have affixed my signature.

FRED RAPP.